April 8, 1924.
C. VOELKER
1,490,048
LANDING NET
Filed Dec. 7, 1921
2 Sheets-Sheet 1
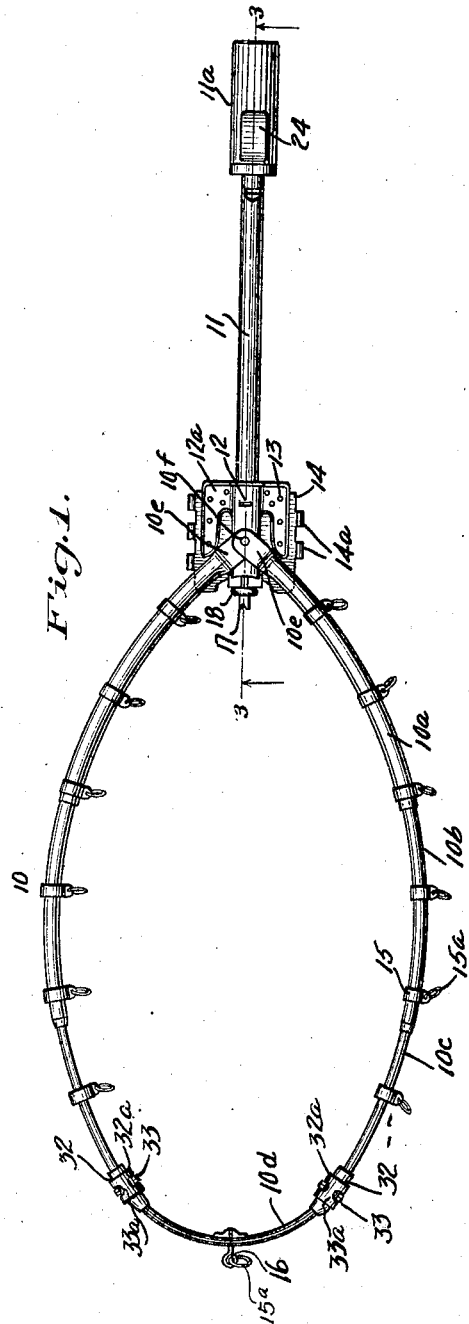
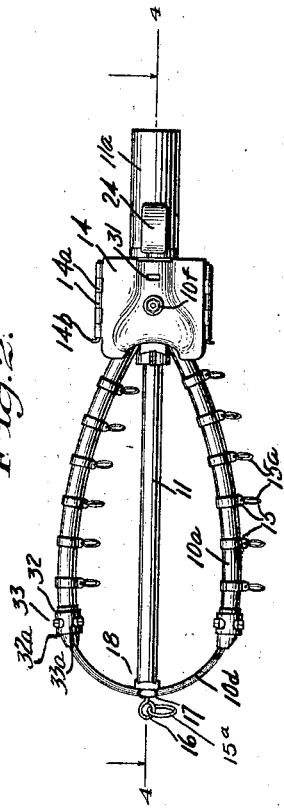
WITNESSES
INVENTOR
CHRISTOPHER VOELKER
BY
ATTORNEYS April 8, 1924.
C. VOELKER
1,490,048
LANDING NET
Filed Dec. 7, 1921
2 Sheets-Sheet 2
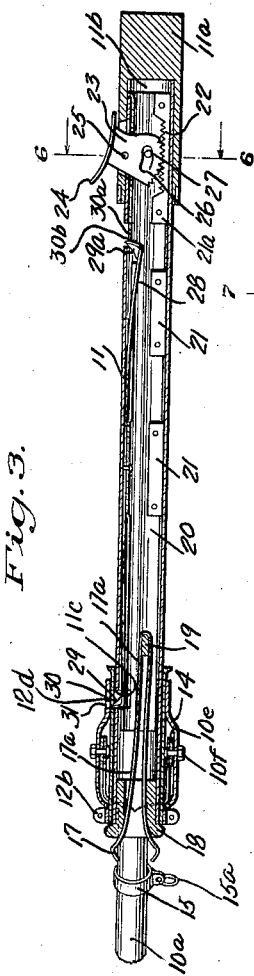
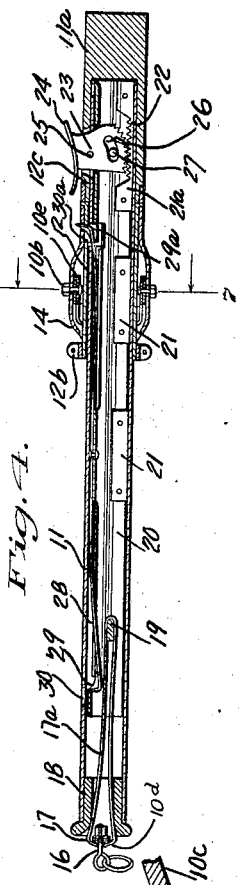
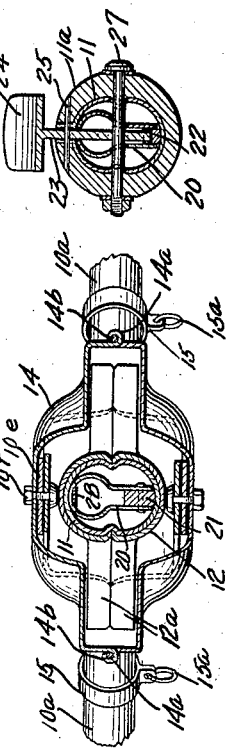
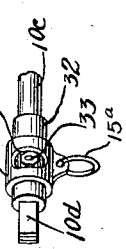
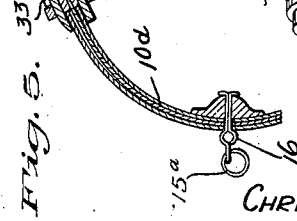
WITNESSES
INVENTOR
CHRISTOPHER VOELKER
BY
ATTORNEYS Patented Apr. 8, 1924.

1,490,048

UNITED STATES PATENT OFFICE.

CHRISTOPHER VOELKER, OF GREAT FALLS, MONTANA, ASSIGNOR OF ONE-HALF TO ARTHUR W. DAVIS, OF HOBSON, MONTANA.

LANDING NET.

Application filed December 7, 1921. Serial No. 520,583.

*To all whom it may concern:*

Be it known that I, CHRISTOPHER VOELKER, a citizen of the United States, and a resident of Great Falls, in the county of Cascade and State of Montana, have invented a new and Improved Landing Net, of which the following is a description.

My invention relates to a landing net for use in fishing and more particularly the invention relates to a collapsible landing net. Landing nets have been made collapsible but with the usual forms of these, it is not feasible to carry such nets in collapsed condition when actually fishing because they require the use of both hands to restore them to a form for landing a fish. The usual landing nets also are carried on the outside of the clothing and are liable to catch on briers, bushes, weeds, or other objects in the path of or adjacent to the fisherman.

The general object of my invention is to provide a landing net that may be collapsed into a form to be carried in the pocket of the fisherman and slightly protruding therefrom to be readily grasped and the form of which permits of the net being instantly brought by the use of one hand of the fisherman to the normal condition for landing a fish.

A further object of the invention is to provide an embodiment of the invention reflecting practical considerations with respect to simplicity of construction and precision of operation in the collapsing and restoring of the net.

The nature of the invention and its distinctive features and advantages will clearly appear as the description proceeds.

Reference is to be had to the accompanying drawings, it being understood that the drawings are merely illustrative of one example of the invention.

Figure 1 is a plan view of a landing net embodying my invention, the net proper being omitted;

Figure 2 is a similar view with the parts in collapsed form;

Figure 3 is a longitudinal section on the line 3—3, Figure 1, showing the handle and adjacent parts in the normal positions;

Figure 4 is a view similar to Figure 3 but with the parts collapsed;

Figure 5 is a detail in horizontal section at the front of the net frame;

Figure 6 is an enlarged cross section on the line 6—6, Figure 3;

Figure 7 is an enlarged cross section on the line 7—7, Figure 4.

Figure 8 is a perspective view of a detail to be hereinafter referred to.

In carrying out my invention in accordance with the illustrated example, a net frame is provided, here designated generally by the numeral 10 as well as an elongated handle element 11 having the rear end $11^a$ enlarged to constitute a grip, said element being adapted to have axial movement relatively to the frame. The element 11 is afforded sliding movement through a sleeve 12 at the medial line of the net, said sleeve in the present instance having side wings $12^a$ riveted together as at 13 or otherwise suitably fastened. About the sleeve 12 is a housing 14 advantageously formed of separable side sections and here shown as formed with alining knuckles or elongated eyes $14^a$ which are adapted to register for receiving pins $14^b$ for fastening the sections together.

The frame 10 has its opposite sides formed with telescoping sections the rear tubular sections $10^a$ receiving the forward sections when collapsed, the telescoping sections in the illustrated example consisting of tubular members $10^b$ telescoping in the rear sections $10^a$ and forward telescoping sections $10^c$ which may be rod material and adapted to telescope in the next rearmost sections $10^b$. The front ends of the telescoping rod sections $10^c$ at opposite sides are united by a bowed spring $10^d$ constituting the front end of the frame 10.

The rear ends of the frame elements $10^a$ are flattened as at $10^e$ and pivotally secured by bolts $10^f$ or other means to the respective housing sections 14, so that the said frame sections $10^a$ may have pivotal movement toward and from each other in the expansion and collapsing of the net frame.

On the respective telescoping sections $10^a$, $10^b$, $10^c$ I provide slidable net holders 15 which in the form shown are provided with rings $15^a$ to which may be suitably fastened a net (not shown). The net also, if desired, may be fastened at the front to an additional ring $15^a$ on an eye 16 appurtenant to the spring $10^d$ at the center of the latter. An important function of the eye 16 is to receive a spring latch 17 carried on the front end of the elongated handle element 11 and presenting spring jaws to enter said ring 16 when the frame 10 is collapsed as in Figure 2.

Suitable manually operable means is provided to cause the jaws of the spring 17 to open or close as desired. In the illustrated example the spring jaws are formed of spring metal returned on itself to form an elongated shank 17$^a$ which extends into the tubular handle element 11 through a bushing 18 at the front of said element. The rear end of the shank 17$^a$ is looped about a cross piece 19 in a tubular slide 20 which may have a limited reciprocating movement in the handle element 11. As here shown the slide 20 is formed of a strip of sheet metal and the sides brought together on parallel lines, there being spacing blocks 21, 21$^a$ secured between the sides. The rear spacing element 21$^a$ is formed with a longitudinal rack 22, the teeth of which are engaged by a toothed sector 23 extending through the side of the grip 11$^a$ and formed at the exterior of the grip with a thumb rest 24. The sector 23 is rockably mounted on a transverse pivot pin 25 and has a slot 26 through which a limiting pin 27 passes. By rocking the sector 23 by thumb pressure a slight forward or rearward movement may be given to the slide 20, clearance being afforded in the grip 11$^a$ of handle element 11 as indicated at 11$^b$, Figure 3, for the movements of said slide 20 by the sector 23. The forward and rearward movements of the slide 20 will project the jaws of the spring latch 17 sufficiently beyond the bushing 18 for the jaws to spring open for releasing the eye 16 and spring 10$^d$. On the other hand when the frame is collapsed by rearward pressure, the housing 14 and the sleeve 12 therein will slide rearwardly on the handle element 11 and dispose the spring 10$^d$ in position for the eye 16 to be engaged by the spring latch 17 so that said eye 16 will be engaged by the spring latch when the jaws of the latter are closed by a rearward movement of the slide 20 in response to a forward rocking of the sector 23.

In connection with the slide 20 I provide means for latching the housing 14 to the handle 11 in either the forward position of said housing or in the rearward position assumed by said housing 14 when the frame is collapsed, for which purpose I provide an elongated plate spring 28 on the slide 20, the forward end of said spring having a catch 29 and the rear end having a similar catch 29$^a$. The forward catch 29 is adapted to be projected laterally through an opening 11$^c$ in the handle 11 and registering opening 12$^d$ in the sleeve 12 and through a registering opening 31 in the housing 14. The rear catch 29$^a$ is adapted to be projected through an opening 30$^a$ in the sleeve 12 and a registering opening 30$^b$ in the handle 11.

By the described construction the collapsed landing net protruding from the pocket may be readily grasped with one hand and the same hand may be employed to exert thumb pressure on the sector 23 to rock the latter, causing the slide 20 to move forwardly, thereby releasing the housing 14 from the catch 29$^a$ and simultaneously opening the jaws of the spring catch 17 to release the eye 16. A swinging movement of the fisherman's arm holding the net, will cause the telescoping sections 10$^b$, 10$^c$ of the looped net frame 10 to move outwardly under centrifugal force, or the momentum acquired by the frame in swinging, the rear sections 10$^a$ pivoting on the pins 10$^f$, and the housing 14 with the sleeve 12 readily sliding forwardly on the handle 11.

I have shown the spring 10$^d$ as formed of inner and outer leaves and an intermediate leaf, the latter being the longest and extending at its ends into the frame sections 10$^c$, the outer leaves of the spring being received in the forward ends of thimbles or ferrules 32 on the sections 10$^c$ at the front ends, said thimbles or ferrules 32 being secured to the sections 10$^c$ by transverse bolts 33 or the like.

A net ring 15$^a$ is associated with each thimble or ferrule 32, said ring being secured to a sleeve 32$^a$ loose on the thimble 32 and having slots 33$^a$ through which the bolts 33 pass affording clearance for turning movements of said sleeve.

I would state in conclusion that while the illustrated example constitutes a practical embodiment of my invention, I do not limit myself strictly to the exact details herein illustrated, since, manifestly, the same can be considerably varied without departure from the spirit of the invention, as defined in the appended claims.

Having thus described my invention, I claim:

1. In a device of the class described, a handle, and a frame adapted to receive a net and slidably held to the handle, said frame formed of sections collapsible lengthwise and accommodating the handle between the sides of the frame in the collapsed form of the frame.

2. In a device of the class described, a handle, and a frame forming a loop and adapted to receive a net, said frame being slidably fitted at its rear end to said handle, said frame formed of telescoping sections.

3. In a device of the class described, a frame adapted to receive a net and slidably held to the handle, said frame having telescoping sides one within another and accommodating the handle between the sides when the frame is collapsed; together with means to latch the front end of the collapsed frame to the front end of the handle.

4. In a device of the class described, a collapsible frame adapted to receive a net, and a handle slidable axially into the frame; together with co-engaging means on the handle at the front and on the frame at the front to latch the handle to the collapsed frame.

5. In a device of the class described, a net frame having its sides formed of telescoping sections, a handle, and means slidable on said handle and having pivotal connection with said sides.

6. In a device of the class described, a frame having sides formed of telescoping sections, the rearmost sections having their ends pivoted, and a handle movable into the frame with the telescoping of the sections.

7. In a device of the class described, a frame having sides formed of telescoping sections, the rearmost sections having their ends pivoted, and a handle slidable into or from the frame with the telescoping of the sections; together with means to latch the front end of the collapsed frame to the handle.

8. In a device of the class described, a frame having collapsible sides, a handle slidable into or from said frame, and coacting latch means on said handle and said frame to hold the frame collapsed.

9. In a landing net, a net frame having telescoping sides connected at the front by a bowed spring extending continuously across the front from one side to the other.

10. In a landing net, a net frame having telescoping sides connected at the front by a bowed spring extending across said front in bowed form, and a handle on which said frame at its rear end is slidable.

11. In a landing net, a net frame having telescoping sides connected at the front by a bowed spring, and a handle on which said frame at its rear end is slidable; together with coacting latch means on the said handle at the front and on said bowed spring.

12. In a device of the class described, a collapsible net frame, a handle therefor, a sleeve on the handle, to which sleeve said frame is secured at its rear end, a latch means at the front end of the handle adapted to engage said frame at the front, latch means to hold said sleeve in the forward or the rearward position, and manually operable means associated with the handle to control both of said latch means.

13. In a device of the class described, a collapsible net frame, a handle therefor, a sleeve on the handle, to which sleeve said frame is secured at its rear end, a latch means at the front end of the handle adapted to engage said frame at the front, latch means to hold said sleeve in the forward or the rearward position, an element slidable in the handle and carrying both of said latch means, and a rockable member on the handle and connected with said sliding element to actuate the latter for controlling both of said latch means.

CHRISTOPHER VOELKER.